Dec. 5, 1944. W. G. GREEN 2,364,209
SEISMIC PROSPECTING
Filed Aug. 14, 1943 3 Sheets-Sheet 1
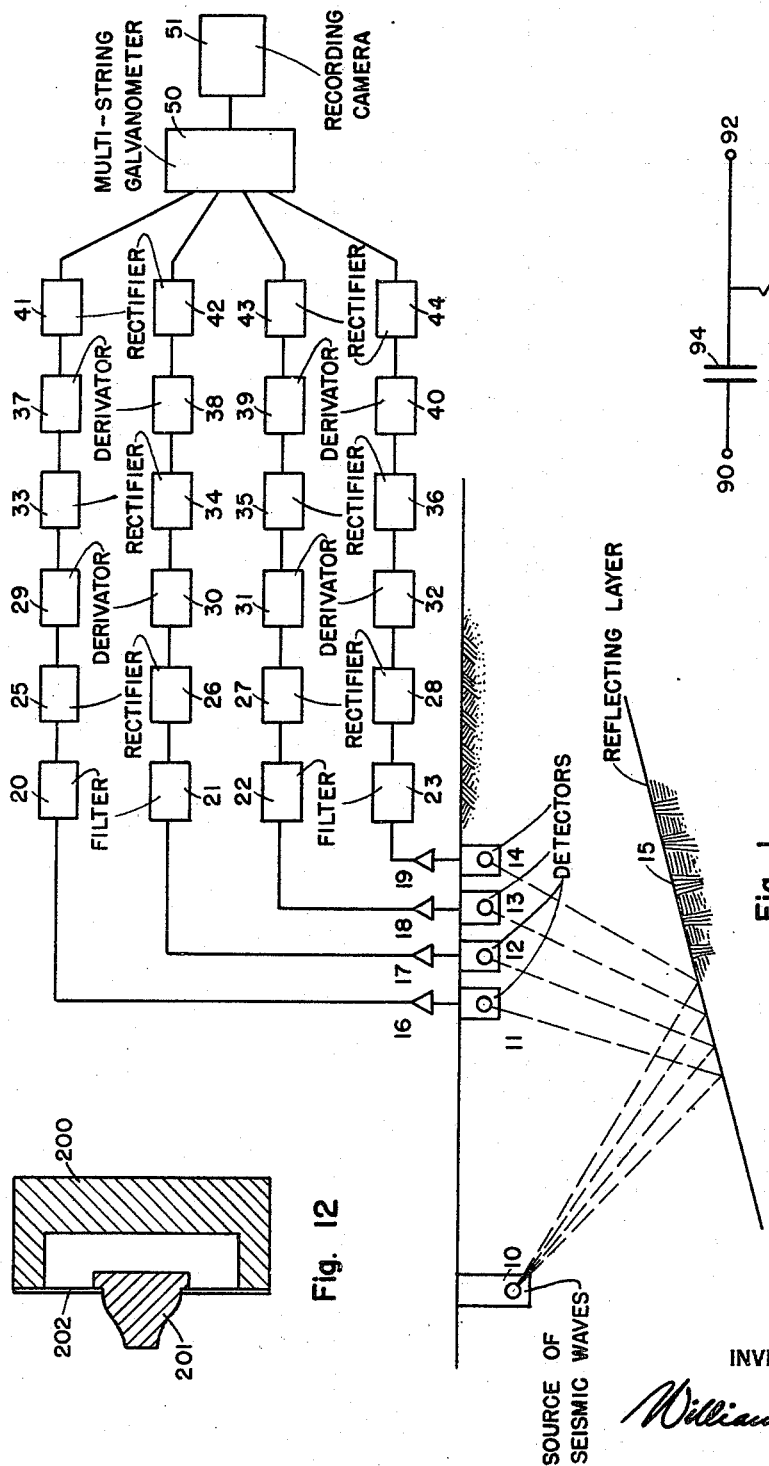
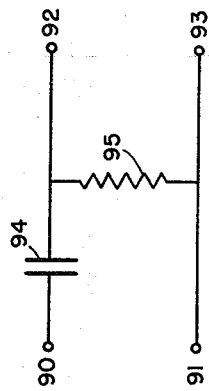
INVENTOR
William G. Green Dec. 5, 1944. W. G. GREEN 2,364,209
SEISMIC PROSPECTING
Filed Aug. 14, 1943 3 Sheets-Sheet 2

INVENTOR
William G. Green

INVENTOR
William G. Green

Patented Dec. 5, 1944

2,364,209

UNITED STATES PATENT OFFICE 2,364,209

SEISMIC PROSPECTING

William G. Green, Tulsa, Okla.

Application August 14, 1943, Serial No. 498,903

4 Claims. (Cl. 177—352)

This invention relates to improvements in seismic prospecting methods and apparatus and more particularly to a method and means for utilizing in seismic prospecting work waves of considerably higher frequency than those that have been heretofore used.

In the seismic prospecting methods, the waves are usually (although not necessarily) initiated by an explosion. The primary wave resulting from an explosion is propagated through the earth and is in part reflected, refracted and diffracted by the various changes in structure which it encounters, and portions of the reflected and diffracted wave fronts return to the earth's surface. The return portions of the wave are detected at a position spaced in known distance and direction from the point of explosion by a plurality of microphones or "geophones" carefully spaced along a known base line or base lines, and the detected wave is amplified and recorded for study.

With the method and apparatus heretofore used in recording the seismic waves difficulties have been encountered in ascertaining exactly at what instant seismic waves which have been reflected from subsurface strata begin to arrive at the detecting instrument or geophone. When earth shocks are transmitted in the form of mechanical waves, it is observed that at a point spaced from the transmission point, there is a series of trains of waves which persists for a limited period of time, each train representing shocks transmitted along a distinct path. Experiments have proven that certain types of geological formations encountered at various paths traversed by wave trains exhibit frequency selectivity in that they exert a preference for sound waves of certain frequencies and discriminate against waves of other frequencies. These experiments have also proven that the earth, as a transmitting medium may be considered as possessing certain filtering effects and each of the paths through which the wave train travels is characterized by a certain predominant frequency which may be defined as "the resonant frequency of the wave path." It has been found that the reflected paths traversing the consolidated deeper subsurface formations have a resonant frequency in the range of 30 to 50 cycles per second and that the direct paths traversing the less consolidated layers nearer the earth's surface have resonant frequencies below 30 cycles per second.

In the design of seismic equipment used prior to my present invention a great amount of attention was given to the resonant frequencies of the direct and reflected paths and appropriate filtering networks were provided in order to attenuate the resonant frequency due to the direct path and to emphasize the resonant frequencies of the reflected paths. The essential and characteristic feature of the present invention consists in the use of frequencies considerably above the resonance values for the direct and reflected paths and consequently entirely new design problems have been encountered and solved in connection with the present method.

It is well known that because of the relatively low frequencies used in the prior art the wave trains traversing the direct path were relatively long and persisted for a long period of time so that the reflected wave train arrived at the geophone before the direct wave train had time to decay. This resulted in an overlapping of both wave trains which in many instances has masked completely any indications of the arrival of the reflected wave trains.

It is the purpose of my present invention to obviate the inconveniences of the prior art and to provide a system in which the wave trains resulting from the direct and reflected paths will be of a considerably shorter duration and will impress themselves upon the seismic record at different times without causing any overlapping.

It is therefore apparent that in the past the requirements that guided the design of seismic equipment consisted in eliminating the resonant frequencies of the direct path in order to emphasize the resonant frequencies of the reflected path. In the present method, however, I am proposing to abandon entirely any considerations that are based on resonant frequencies and am proposing a system which will utilize the behavior of various earth paths to frequencies much higher than the resonant range. In particular, I am proposing to utilize frequencies above 1000 per second. Consequently, there will be no selective attenuation effects and all the incoming waves will impress themselves upon the seismogram in form of successive damped wave train impulses. The essential advantage of my invention resides in the fact that at frequencies above 1000 cycles per second the wave trains are of considerably shorter duration and each wave train will appear on the records separately from other wave trains. In such a manner the seismic record will enable us to easily identify energy arrivals from various geological horizons.

The feasibility of utilizing high frequency acoustic waves has been corroborated by other investigators. Several attempts have been made in the past to apply high frequency waves for geological reconnaissance methods. Among other investigators R. A. Fessenden has proposed in his U. S. Patent 1,240,328, issued on September 18, 1917, to utilize sound originated by the oscillator discharge of a condenser in a technique that closely resembles the reflection prospecting method. There does not appear, however, to be any record of experimental work performed by Fessenden in connection with his method. More recently Humble Oil Company undertook a research on the propagation of high frequency waves through the earth. The results obtained were described by L. G. Howell, C. H. Keen and R. R. Thompson and published in an article "Propagation of elastic waves in the earth," Geophysics, January, 1940, pp. 1-14. According to the authors of said article the seismic characteristic of the earth have been found to vary widely with frequency. For instance, dry surface layers have offered considerable attenuation to high frequencies. However, the attenuation has dropped to much lower values in the deeper water saturated beds. The authors made an experiment by utilizing a 400 cycles pulse and a 60 cycles pulse and transmitted both pulses over a distance of 12,000 feet. They have determined that the attenuating effect is smaller in case of waves having a 400 cycle than is the wave having 60 cycles. This led them to the conclusion that there is a definite possibility of utilizing frequencies higher than those that have heretofore been used. It has been also found by the authors of the above referred to article that in various instances the velocity of propagation of the high frequency waves in the earth are remarkably close to the velocity of sound in water and that the amplitude does not decay with distances as fast as might be expected. In one instance the decrease of amplitude has been found to be considerably less than according to the inverse square law.

The present invention has as a purpose to continue the aforementioned work of L. G. Howell, C. H. Keen and R. R. Thompson and to provide the seismic prospecting equipment with certain novel features by means of which all the prior attempts can be successfully converted into a commercial system for oil exploration.

The present invention will be apparent from the following description taken with reference to the attached drawings, wherein:

Fig. 1 is a diagrammatic representation of an arrangement used in accordance with my invention for the seismic exploration by means of high frequency waves.

Fig. 8 shows schematically a derivating network used in the representation of Fig. 1.

Fig. 12 represents structural details of a sound transmitter or detector which is being used in connection with the arrangement shown in Fig. 9.

Figure 11:
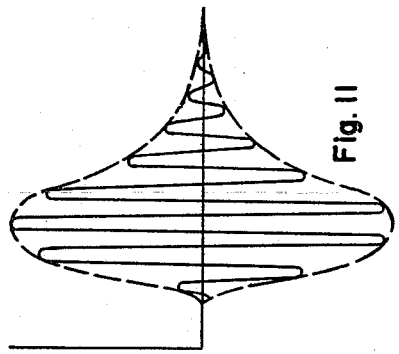
Fig. 11 shows a modulated wave impulse transmitted to the earth by means of the arrangement of Fig. 9.

Referring now more particularly to Fig. 1, elastic waves are generated in the earth at point 10. Two methods of generating waves can be used in connection with the present invention (a) utilizing a single impulse for imparting the energy into the earth, and (b) utilizing an amplitude modulated wave train. The first of the above methods can be effected by detonating an explosive charge in the shot point. This charge may consist of any suitable detonating material such as dynamite, nitroglycerine etc. in quantities depending on the nature of the ground being explored and the distance used between different stations.

Instead of detonating dynamite I may also use a method described in my U. S. Patent 2,203,140, issued June 4, 1940. By means of this method I am causing a gas pressure in an enclosed chamber to build itself up until a predetermined critical value is reached and to break a mechanical element by the critical pressure, thus applying suddenly a pressure impulse upon the surface of the earth. I consider this method as described in my U. S. Patent 2,203,140 as being particularly adapted to the present problem since it enables me to impart upon the earth an impulse of predetermined characteristics and to emphasize in the spectrum of the impulse any desired range of frequency components.

At points 11, 12, 13 and 14 geophones are imbedded in the ground. Although four geophones are shown in Fig. 1 it is clear that the number of geophones as well as their spacing from the shot point and from each other depends on the particular problem and the local conditions. These geophones may be of any desired construction such as of the moving coil type, the carbon button type, or the piezo electric type and each of said geophones may have a resonant frequency of any desired number of cycles per second. The elastic waves generated near the surface of the earth reach a reflecting layer 15 and are reflected upwards towards the geophones 11—14 wherein they are converted into electrical currents amplified in amplifiers 16, 17, 18 and 19, respectively, and subsequently transmitted to filters 20, 21, 22 and 23 respectively. Each of the filters 20-23 is a high pass filter which attenuates all the frequencies below 1000 cycles and transmits only the frequencies higher than 1000 cycles.

Figure 2:
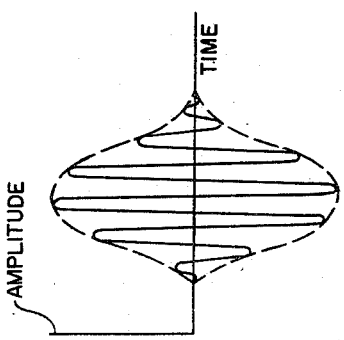
Fig. 2 is a diagram of an electrical impulse derived from the earth's motion.

It is therefore apparent that by means of my equipment as illustrated in Fig. 1, I am attenuating all the low frequency wave trains and am transmitting only the wave trains of frequencies above 1000 cycles per second. The high frequency wave trains are of a considerably shorter duration and therefore even in case of relatively shallow reflecting beds each geophone receives a succession of distinct and separate wave packets each of the said wave packets having a form substantially as shown in Fig. 2 and resulting from direct, refracted and reflected paths.

In prior methods of seismic prospecting utilizing wave trains below 1000 cycles per second, the wave packets resulting from direct, reflected and refracted paths were not attenuated very rapidly, and consequently difficulty has been experienced due to the fact that directly transmitted impulses or waves have not had time to decay when the reflected impulses began to return to the geophone and consequently an overlapping took place between the direct and reflected waves. According to this invention the difficulty occurring by reason of overlapping of the direct and reflected impulses is avoided or reduced by providing an electrical filtering network that attenuates the lower frequencies and produces a seismographic record only of the frequencies higher than 1000 cycles per second.

It is therefore apparent that if the duration of a seismic wave train at the geophone be so reduced that the actual impulse fed to the recorder and due to the direct path is over before the reflected wave train which has travelled to the reflecting layer 15 is picked up, it will be possible to distinguish at the receiver between the reflected wave train and the direct wave train. Thus, by using high frequency waves the effective impulse time at the receiver is shortened and the seismographic records are clearer and more adaptable for interpretation.

Figure 4:
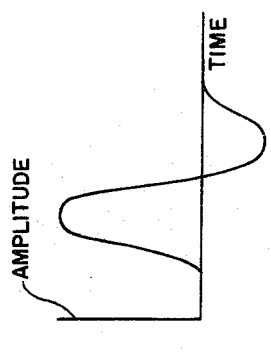
Fig. 4 is a diagram of an impulse representing the derivative of the impulse of Fig. 3.
Figure 3:
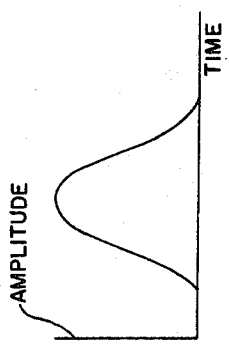
Fig. 3 is a diagram of an impulse derived from the rectification of the impulse shown in Fig. 2.

Referring now more particularly to Fig. 1 there is shown in conventional graphical form a wave train representing direct reflected or refracted energy. This wave train is transmitted through the filter 20 and applied to a rectifier 25 which produces across its output terminals a voltage as represented in conventional graphical form in Fig. 3. The output voltage of the rectifier 25 is subsequently applied to a derivator network 29 which produces across its output terminals a voltage that substantially represents the derivative of the voltage shown in Fig. 3 and which is shown in Fig. 4. The structural details of a derivator network are explained in connection with Fig. 8.

Figure 5:
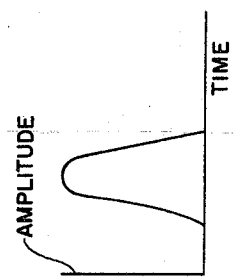
Fig. 5 is a diagram of an impulse derived from the rectification of the impulse of Fig. 4.
Figure 7:
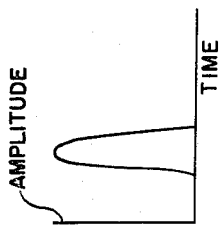
Fig. 7 is a diagram of an impulse obtained from the rectification of the impulse of Fig. 6.
Figure 6:
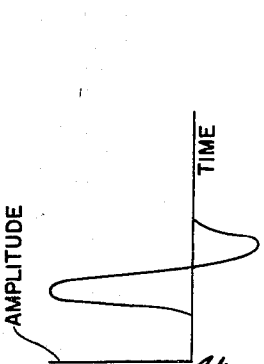
Fig. 6 is a diagram of an impulse representing the derivative of the impulse of Fig. 5.

The voltage derived from the derivator 29 is subsequently rectified in a rectifier 33 and then applied to another derivator 37 and after having passed through the derivator 37 is rectified again in a rectifier 41. The voltages that are produced across the output terminals of the rectifier 33, derivator 37 and rectifier 41 are shown in Fig. 5, Fig. 6 and Fig. 7 respectively.

From the inspection of Fig. 3 to Fig. 7 it becomes apparent that producing a time derivative of an impulse and subsequently rectifying said time derivative has an effect of shortening considerably the duration of the original impulse. Thus, Fig. 5 represents a shortened impulse which has been obtained from the original impulse shown in Fig. 3. The impulse of Fig. 5 is shortened again by transmitting it through the second derivator-rectifier stage whereby we obtain an impulse substantially as shown in Fig. 7 which is transmitted to the multistring galvanometer 50 and the recorder in the camera 51.

Consider now Fig. 8 representing schematically the diagram of a derivator circuit represented by either of the blocks 29, 30, 31, 32, 37, 38, 39 and 40 in the arrangement of Fig. 1. The derivator circuit is provided with input terminals 90, 91 and output terminals 92, 93 and consists of a condenser 94 inserted between the terminals 90 and 92 and of a resistor 95 between the terminals 92 and 93. The operation of the derivator can be explained mathematically as follows:

Let $B_1(t)$ be the function representing the voltage applied across the input terminals 90 and 91 of the derivator, $B_2(t)$ the function representing the voltage across the output terminals 92 and 93, $C^1$ the capacitance of the capacitor 94, $R^1$ the resistance of the resistor 95 and $i(t)$ the current flowing through the capacitance 94.

Assume also that the output terminals 92 and 93 of the derivator are connected to an infinite resistance. Consequently, the same current $i(t)$ flows through the capacitance 94 and through the resistance 95 and the following relation holds true:

$$B_1(t) = \frac{1}{C^1}\int i(t)dt + R^1 i(t) \qquad (1)$$

Differentiating the equation above we obtain:

$$\frac{dB_1(t)}{dt} = \frac{1}{C^1}i(t) + R^1\frac{di(t)}{dt} \qquad (2)$$

By selecting the proper values of the resistance $R^1$, for example, making $R^1$ negligibly small if compared to $1/C^1$, the term $R^1 di/dt$ can be made negligible if compared to $i(t)/C^1$ and the following relation may hold with an approximation satisfactory for practical purposes:

$$\frac{dB_1(t)}{dt} = \frac{1}{C^1}i(t) \qquad (3)$$

Multiplying both sides of the Equation (3) by $C^1 R^1$ we obtain:

$$C^1 R^1 \frac{dB_1(t)}{dt} = R^1 i(t) = B_2(t) \qquad (4)$$

Consequently, the expression $R^1 i(t)$ which represents the voltage drop across the resistor 95 between the output terminals 92 and 93 is substantially proportional to $dB_1(t)/dt$ which represents the time derivative of the input voltage across the terminals 92 and 93. The relation (4) results from neglecting the term $R^1 di/dt$ in the Equation (2) and the approximation obtained has been found to be satisfactory by taking $C^1$ equal to 0.0003 microfarad and $R^1$ equal to 10,000 ohms.

Figure 9:
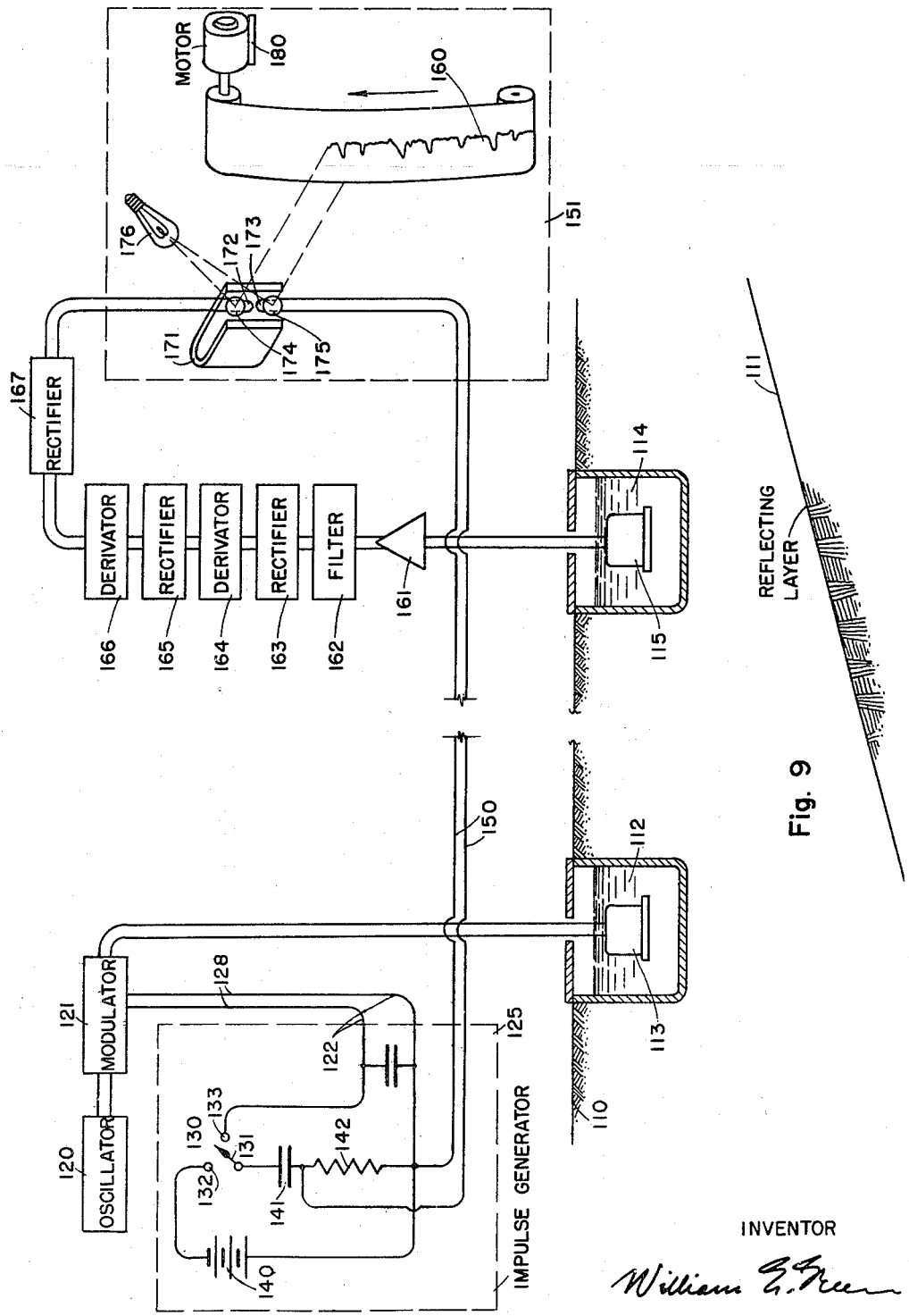
Fig. 9 shows schematically an arrangement for transmitting into the earth modulated wave trains.

Figure 9 shows another embodiment of my invention in which I am generating and imparting to the ground a modulated high frequency impulse. As shown more particularly in the drawings, 110 represents the surface of the ground, 111 represents a reflecting layer, and 112 represents a hole in the earth of any desired depth and containing a source of seismic waves 113. At a suitable distance from 112 is located another hole, designated as 114, containing a receiver 115 which is adapted to receive the seismic waves derived from said source.

The holes 112 and 114 contain fluidtight tanks of cement or metal, which are imbedded in the ground. They are filled with water or other fluid such as oil or with a combination of fluids such as carbonate of soda and water. The tanks are preferably placed in wet ground or the ground is wet so as to make good physical contact between the walls of the tank and the ground so as to transmit sound freely. For example, if cement is used, the rock of the cement should not be sound absorbing or have a velocity of sound transmission differing greatly from that of the cement itself. The tanks are preferably covered over to prevent evaporation.

The transmitter 113 and the receiver 115 are of a standard design, and are designed for the generation and reception of sound waves having frequencies of about 5000 cycles per second. In order to energize the transmitter 113, oscillating currents are generated in the oscillator 120 which may comprise rotating machines, or oscillating vacuum tube circuits. When these oscillations are impressed upon the detector 113 which may comprise a condenser, the variations of electrical potential will cause vibrations of a frequency corresponding to the frequency of the impressed electrical variations. This will in turn produce sound waves of a corresponding frequency.

A particular advantage to be derived from the use of above frequencies, is that these frequencies can be conveniently modulated and thereby serve as carrier frequencies for transmitting an impulse substantially analogous to the impulse produced by means of an explosion as shown in the embodiment of Fig. 1.

Figure 10:
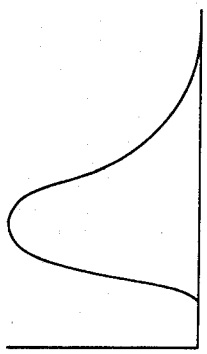
Fig. 10 shows a condenser discharge obtained in connection with the arrangement shown in Fig. 9.

Therefore, the high frequency currents derived from the oscillator 120 are applied to a modulator 121, in which these currents are being modulated by a voltage impulse substantially as shown in Fig. 10 the said impulse being derived from the output terminals 122 of the impulse generator 125 and applied through the leads 128 to the modulator 121. Consequently, across the output terminals of the modulator 121 there appears voltage substantially as shown in Fig. 11 which is subsequently applied to the transmitter 113.

The impulse generator contained within the block 125 comprises a switch 130 which consists of a rotatable member 131 and two fixed terminals 132 and 133. By connecting the rotatable member 131 to the terminals 132 a battery 140 is allowed to charge a condenser 141 through a resistor 142 and subsequently by disconnecting the movable member from the terminal 132 and connecting it to the terminal 133 the condenser 141 is allowed to discharge through the resistor 142 and the leads 122. The leads 122 are applied to the modulator 121 and provide the modulating component of the transient represented in Fig. 11.

It is apparent that at the instant at which the transient illustrated in Fig. 11 is produced, an electrical signal current is being transmitted through the leads 150 from the resistor 142 and applied to a recording galvanometer included in the block 151 thereby producing the first time break upon a movable strip 160.

It is therefore apparent that I have produced a modulated seismic impulse substantially as shown in Fig. 11. This impulse after having traveled through the ground arrives at the detector 115 and becomes then translated into a corresponding electrical impulse which becomes subsequently amplified in an amplifier 161 and applied to a filter 162. The filter 162 has characteristics similar to the filter designated by the numerals 20 to 23 in Fig. 1, i. e., it is adapted to transmit only frequencies above 1000 cycles per second. The output of the filter is rectified in a rectifier 163 and then transmitted through a stage comprising a derivator 164 in cascade with a rectifier 165 and another stage comprising a derivator 166 in cascade with a rectifier 167. The voltage outputs derived from filter 162, rectifier 163, derivator 164, rectifier 165, derivator 166 and rectifier 167 are substantially similar to those shown in Figs. 2, 3, 4, 5, 6 and 7.

The output terminals of the rectifier 167 are connected to a galvanometer which comprises a field magnet 171 and oscillograph elements 172, 173 which are well damped so as to reproduce low frequencies faithfully in wave form and in phase. Mirrors 174 and 175 are carried by the oscillograph elements 172 and 173 respectively. Light from an incandescent lamp 176 is projected upon the mirrors 174 and 175 for reflection upon a light sensitive strip of paper 160. A suitable means is provided such as a synchronous motor 180 for moving the light sensitive paper 160 past the light spot reflected by the mirrors 174 and 175. The oscillograph element 172 is connected to the output terminals of the rectifier 167 and the oscillograph element 173 is connected to the leads 150.

The mirrors 174 and 175 direct two beams of light upon the strip 160 and are adapted to modify the light in accordance with the instantaneous amplitude of signals derived from rectifier 167 and leads 150 respectively, so as to produce a record trace on the strip corresponding to the fluctuating electrical signals. The trace thus obtained contains a signal derived from leads 150 and indicating the instant of initiating the seismic impulse and contains also subsequent signals which represent the resulting seismic waves received at 115.

Consider now Fig. 12 representing diagrammatically the structural details of a sound generator designated by 113 in the arrangement of Fig. 9. The sound generator comprises a cylindrical casing 200 and a cylindrical oscillating member 201. The oscillator 201 is connected with the casing 200 by an annular fastening member 202 which, for instance, is an annular diaphragm. The oscillating member 201 or the whole apparatus has its outer surfaces exposed to the medium through which the compressional waves or sound signal is to be propagated or received. The medium assumed is water or other fluid contained in the hole 112.

The oscillating member 201 is a solid cylinder the length of which is a function of the length of the compressional waves propagated through it. The length is in this case equal to $\lambda/2$. If, for example, the oscillating member 201 is made of steel, the speed of propagation of sound therein will be approximately 5,000 meters per second. Thus, if sound waves having a frequency of 5000 vibrations per second are used, their wavelength $\lambda$ in this material will be 100 centimeters; since half this wavelength is 50 centimeters, the length of the cylinder would then be 50 centimeters.

As stated above the sound transmitter is excited by an oscillating electric field undergoing 5000 alternations per second, the field being confined to the volume between the outer circular surface of the cylinder 201 and the inner circular surface of the casing 200. The oscillator 201 is, with this mode of excitation, electrically insulated from the casing 200. This can be most readily effected by inserting insulating material between the parts 200 and 201. It is well known that in a mechanical structure having a greater mass at one end than at the other the amplitude of vibration at the end of smaller mass is greater than the amplitude of vibration at the end of greater mass. Theoretically and experimentally, it has been found that the greatest efficiency in sound transmission is obtained when the amplitude of the vibrations of the inner circular surface of 201, e. g., that adjacent the inner circular surface of 200, is one-third of the amplitude of the vibrations of the outer circular surface 201, e. g., the circular surface of the cylinder 201 remote from the casing. In order to accomplish this the cylinder is made thicker in cross-sectional area at 202 or its vicinity. Thus the cylinder 201 will oscillate in such a manner that the amplitude of the oscillations of its inner circular surface will be one-third the amplitude of the oscillations of the outer surface.

As is apparent from the above, the sound apparatus is of very simple construction, at least for the frequency band mentioned. With the correct mutual adjustment of the amplitude of the vibrations produced at the inner surface of the oscillator 201 and the amplitude of the vibrations produced at the outer or radiating surface 201, greater efficiency can be obtained in transmission. The magnitude of the vibrational amplitude produced at the inner circular surface of the oscillator 201 depends upon the particular type of excitation used. In this discussion, electrical, e. g., electrostatic, excitation has been assumed although other means are also possible. The magnitude of the vibrational amplitude produced at the outer circular surface of oscillator 201, however, depends upon the medium through which the sound waves are to be propagated. In this discussion, water is assumed to be the medium. The velocity of sound in water is approximately 1400 meters per second. Thus, the wavelength at sound having a vibrational frequency of 5,000 oscillations per second is about 28 centimeters in water. According to theories well known in acoustics, the damping effect accompanying the use of radiators of zero order (see Physikalische Zeitschrift 1917, page 261), such as are being considered here, is very considerable if the diameter of the radiating surface is only a fraction of the wavelength of the sound waves being propagated. In practice, the oscillator 201 is generally designed to have a relatively large cross sectional area, for example, 201 may have a diameter of 20 centimeters or more.

It is therefore apparent that I have provided a system for conducting seismic explorations by means of waves having frequencies considerably higher than those heretofore used.

I claim:

1. A system for conducting geophysical explorations comprising a transmitting station and a receiving station, the said transmitting station containing a condenser, means for charging said condenser, means for discharging said condenser and transmitting the discharge through two separate channels, an oscillator, a modulator having its input terminals connected to one of said channels and to said oscillator whereby said modulator produces across its output terminals a carrier wave having the frequency of said oscillator and modulated by the discharge of said condenser, a generator of seismic waves connected to the output terminals of said modulator, the said generator being imbedded in the ground and adapted to set up vibrations therein whereby seismic waves may be sent through the earth, the said receiving station comprising a receiving means imbedded in the ground at a convenient distance from said generator and a recording galvanometer, said galvanometer having one pair of its input terminals connected to said receiving means for recording its output and having another pair of its input terminals connected to the other of said channels for recording the instant of initiating the condenser discharge.

2. A system for conducting geophysical explorations comprising a transmitting station and a receiving station, the said transmitting station containing a condenser, means for charging said condenser, means for discharging said condenser and transmitting the discharge through two separate channels, an oscillator, a modulator having its input terminals connected to one of said channels and to said oscillator whereby said modulator produces across its output terminals a carrier wave having the frequency of said oscillator and modulated by the discharge of said condenser, a generator of seismic waves connected to the output terminals of the said modulator, the said generator being submerged in a liquid body inserted in the earth and adapted to set up vibrations therein whereby seismic waves may be sent through the earth, the said receiving station comprising a receiving means submerged in a liquid body inserted in the earth at a convenient distance from the said generator and a multiple recording galvanometer, the said galvanometer having one pair of its input terminals connected to said receiving means for recording its output and having another pair of its input terminals connected to the other of said channels for recording the instant of initiating the condenser discharge.

3. A system for conducting geophysical exploration comprising a transmitting station and a receiving station, said transmitting station containing an impulse generating means, said means being adapted to transmit an impulse through two separate channels, an oscillator, a modulator having its input terminals connected to one of said channels and to said oscillator whereby said modulator produces across its output terminals a carrier wave having the frequency of said oscillator and modulated by the impulse derived from said means, a generator of seismic waves connected to the output terminals of said modulator, said generator being imbedded in the ground and adapted to set up variations therein, whereby seismic waves may be sent through the earth, said receiving station comprising a receiving means imbedded in the ground at a convenient distance from said generator and a recording galvanometer, said galvanometer having one pair of its input terminals connected to said receiving means for recording its output and having another pair of its input terminals connected to the other of said channels for recording the instant of initiation of said impulse.

4. A system for conducting geophysical exploration comprising a transmitting station and a receiving station, said transmitting station containing an impulse generating means, said means adapted to transmit an impulse through two separate channels, an oscillator, a modulator having its input terminals connected to one of said channels and to said oscillator whereby said modulator produces across its output terminals a carrier wave having the frequency of said oscillator and modulated by the impulse derived from said means, a generator of seismic waves connected to the output terminals of said modulator, said generator being imbedded in a liquid body inserted in the earth and adapted to set up vibrations therein, whereby seismic waves may be sent through the earth, said receiving station comprising a receiving means submerged in a liquid body inserted in the earth at a convenient distance from said generator and a recording galvanometer, said galvanometer having one pair of its input terminals connected to said receiving means for recording its output and having another pair of its input terminals connected to the other of said channels for recording the instant of initiation of said impulse.

W. G. GREEN.